United States Patent [19]

Sell et al.

[11] Patent Number: 5,286,095
[45] Date of Patent: Feb. 15, 1994

[54] AIR BRAKE EMERGENCY CONTROL VALVES

[75] Inventors: Edward D. Sell; Sergio Campanini, Iola, both of Kans.

[73] Assignee: Tramec Corporation, Iola, Kans.

[21] Appl. No.: 982,459

[22] Filed: Nov. 27, 1992

[51] Int. Cl.⁵ .............................................. B60T 13/22
[52] U.S. Cl. ...................................... 303/9; 303/9.76; 303/28; 303/71; 137/118
[58] Field of Search ................... 303/7, 8, 9, 9.76, 13, 303/14, 71, 28, 29, 30; 188/170; 137/118

[56] References Cited

U.S. PATENT DOCUMENTS

| | | | |
|---|---|---|---|
| 3,862,782 | 1/1975 | Horowitz et al. | 303/9 X |
| 3,863,992 | 2/1975 | Kurke et al. | 303/9.76 X |
| 3,866,623 | 2/1975 | Klimek | 303/29 X |
| 3,947,072 | 3/1976 | Plantan | 303/13 |
| 4,080,004 | 3/1978 | Ury | 303/29 X |
| 4,131,324 | 12/1978 | Kurichh | 303/9 X |
| 4,593,954 | 6/1986 | Campanini | 303/9 X |
| 5,172,958 | 12/1992 | Sell | 303/9.76 |

Primary Examiner—Robert J. Oberleitner
Assistant Examiner—Peter M. Poon
Attorney, Agent, or Firm—Dowell & Dowell

[57] ABSTRACT

Control valve assemblies for regulating the parking/emergency spring brakes of a tractor trailer air brake system which include valve components for insuring that the spring brakes are not released until pressurization of the system's service reservoir is achieved and which components are operable to exhaust the spring brakes to atmosphere upon the failure of the supply pressures within the system to thereby automatically apply the spring brakes. In one embodiment, the valve components permit pressure to be supplied to release the spring brakes under circumstances when it is not possible to pressurize the service reservoir.

24 Claims, 2 Drawing Sheets

AIR BRAKE EMERGENCY CONTROL VALVES

BACKGROUND OF THE INVENTION

1. Field of the Invention

This invention relates to improvements in air brake control systems for controlling the braking function of multi-axle heavy duty vehicles, including tandemly towed vehicles, and, more particularly, relates to an improved parking/emergency spring brake control valve for use with a trailer, or trailers, being towed behind a tractor. The emergency control valve of the present invention prevents release of the spring brakes during initial charging of the braking system's service reservoir until such time as the pressure within the reservoir has reached a predetermined minimum and wherein upon a failure of the supply pressure within the braking system, the pressure within the spring brakes will be permitted to exhaust to atmosphere thereby causing immediate application of the spring brakes. In one embodiment of the present invention, the emergency control valve assembly permits pressure to be applied or bled directly to the spring brake chambers to thereby release the spring brakes and allow emergency towing of a trailer when it is not otherwise possible to pressurize the trailer's service reservoir.

2. History of the Related Art

The present emergency control valve is designed to provide control of a trailer's spring brakes as required by DOT (Department of Transportation) FMVSS No. 121 as modified by Docket No. 90-3, Notice No. 2. This Notice eliminated the requirement for a "protected tank" for release of the spring brakes of a tractor trailer air brake system in emergency situations. The notice also required that no single leakage type failure in the service system, such as a rupture of the service reservoir, would result in supply line pressure falling below a threshold pressure of 70 psi. The regulations further required that spring brakes not provide any drag when the supply line pressure is 70 psi or greater. One type of spring brake control valve system is disclosed in U.S. patent application Ser. No. 07/830,672 filed Feb. 4, 1992 in the name of Edward Sell and entitled "Air Brake Control Valve System".

In conventional tractor trailer air brake systems, pressurized air is supplied from the tractor to the trailer braking system by way of a service brake (control) line and an emergency brake (supply) line. The control line is connected through a relay valve to pneumatically operate service brakes associated with each wheel of the trailer. In order to assure that the service system has adequate volume to provide for repeated service brake applications, the braking system further includes a service reservoir or tank which is connected through the relay valve so that pressure may be supplied to the service brakes from a relatively large storage volume. The reservoir is pressurized through the supply (emergency) pressurization system which also provides pressure to the emergency or parking brakes of the vehicle. The emergency or parking brakes are generally spring operated with the force of the springs being offset to release the brakes by the use of pressure within the emergency supply system.

In the aforementioned U.S. application Ser. No. 07/830,672, now U.S. Pat. No. 5,172,958, control of supply air to the emergency/parking brakes is provided by special control valve situated between the parking brakes and the service reservoir. The control valve functions to regulate service and supply air to insure maximum air pressure being delivered to the spring brakes and to allow filling of the system's reservoir during normal operation of the air brake system. The control valve further regulates the release of air pressure in the spring brake system when pressure in the supply system drops below a predetermined minimum isolation pressure and prevents compounding of forces in the brake system by venting service air to atmosphere when the spring brakes are applied. The system was designed to meet each of the requirements set forth by the Department of Transportation. As a result of meeting such requirements, under circumstances when the service reservoir of a trailer is being initially pressurized, such as after the reservoir has been intentionally de-pressurized to remove contaminants or when it has become de-pressurized due to leakage when the system is not in use, the parking brakes are released momentarily (for a few seconds) prior to the service reservoir being pressurized to a minimum threshold level. During this period of time, the service brake system of the towing tractor provides braking for the tractor and trailer. Some tractor trailer operators believe that it is important that the spring brakes must not be released, at all, until the pressure within the service reservoir reaches an operable level, even if this would require the mechanical release of spring brakes by caging techniques.

If the air pressure which has been employed to release the emergency brakes is lost, such as when an accident involves the disruption of the air supply to the trailer, the brakes are automatically applied by spring pressure. Common causes of such failures are damaged air connectors or gladhands, damage to the air lines from the connectors to the supply reservoir, damage to the reservoir, failure of a brake chamber, and the like. Under each of these conditions, the brakes are automatically set by spring pressure preventing the vehicle from being moved without mechanically caging the springs by use of a special tool.

To alleviate the problem of mechanically caging the brakes to allow emergency movement of a vehicle under circumstances where the service reservoir is unable to retain pressure, the aforementioned U.S. application Ser. No. 07/830,672 now U.S. Pat. No. 5,172,958 discloses a control valve which enables supply air to be utilized to disengage the emergency or spring brakes allowing a disabled vehicle to be quickly moved from a dangerous location. The valve functions to prevent air supply from flowing into the system's reservoir at any pressure lower than the pressure required to release the spring brakes. Therefore, whenever air is supplied through the control valve, the air is simultaneously made available to the spring brake chambers. There are those however, who do not desire a direct supply of air to the spring brakes prior to providing sufficient reservoir pressure. However, under circumstances where the reservoir has itself been punctured or damaged, emergency towing has not been provided for utilizing conventional systems.

SUMMARY OF THE INVENTION

This invention is generally directed to emergency control valves for regulating the emergency/parking brakes in a tractor trailer air brake system, and for regulating the supply of pressure to the system's service brake reservoir, and for controlling the release and/or application of the vehicle's spring brakes dependent upon variations in the source of pressure supplied through the system's supply brake lines and the service reservoir pressure. The control valve includes a housing having an inlet for supply pressure from an emergency gladhand, a spring brake delivery port for delivering air pressure from the housing to the pressure chamber of an emergency spring brake, an outlet to the service reservoir intermediate the supply inlet and the spring brake delivery port, and a spring brake supply valve which is normally seated so as to close a passageway to the spring brake delivery port thereby preventing flow of pressure from the supply inlet thereto. The spring brake supply valve is normally urged into seated engagement with a valve seat by a spring loaded plunger which delivers sufficient force to insure that the valve remains seated to prevent any pressure from being supplied to the spring brake delivery port, and therefore to the spring brakes, until the pressure within the service reservoir reaches a predetermined minimum.

The valve of the present invention further includes a second inlet port connected to the service reservoir which communicates with the plunger so as to oppose the spring pressure on the plunger for controlling the spring brake supply valve. Therefore, as the reservoir pressure increases to the predetermined minimum, the pressure will offset the spring pressure causing the spring brake supply flow valve to open a passageway to the spring brake delivery port and allowing flow from the supply inlet directly to the spring brakes. Supply pressure to the service reservoir is normally initially obstructed by an internal valve which insures minimum pressure being maintained in the supply line. The internal valve only functions to open a passageway between the supply inlet and the service reservoir outlet when the pressure within the housing reaches a predetermined minimum, such as 70 psi.

In a first embodiment, the spring brake supply valve of the present invention further includes an elastomeric check valve or sleeve which closes an opening therein which communicates the supply inlet with the interior of the housing adjacent the spring brake delivery port. Under circumstances when there is a failure of supply pressure, the spring loaded plunger automatically reseats the spring brake supply valve. However, when the pressure within the spring brake delivery port area is greater than that within the passageway surrounding the valve, the elastomeric check valve will open thereby permitting an initial venting of the spring brake passageway. This initial venting causes a quick release valve within the spring brake delivery area to open discharging the pressure of the spring brakes to atmosphere thereby allowing the immediate application of the spring brakes.

In a second embodiment of the present invention, the spring brake supply valve is provided with a flow restricting port or orifice as opposed to an elastomeric check valve. The orifice is always open to permit communication between the supply inlet port and the spring brake delivery area. The size of the orifice, however, is limited so that when supply pressure is being provided through the control valve, the pressure to the service reservoir will reach the minimum operating pressure before sufficient pressure is allowed to be established in the spring brake chambers to release the spring brakes once they have been applied. The orifice further allows, under conditions wherein the service reservoir is not capable of retaining pressure, a bleeding of inlet supply gas therethrough and into the spring brakes. Under such conditions, the pressure will rise slowly in the brakes until sufficient pressure is established to release the spring brakes.

It is a primary object of the present invention to provide a control valve assembly for the spring (emergency) brakes in a tractor trailer air brake system which prevents the release of the spring brakes once they had been applied so that it is not necessary to utilize the tractor's service brakes to control both the tractor and trailer at any time during the initial pressurization of the trailer service reservoir.

It is also an object of the present invention to provide a control valve assembly for the emergency/parking spring brakes which permits the spring brakes to be exhausted to atmosphere in the event of an emergency when the supply pressure, or the reservoir and supply pressure are removed from the valve assembly.

It is also an object of the present invention to provide an emergency control valve assembly for the emergency/parking brakes of a tractor trailer air brake system wherein the trailer may be moved under emergency situations after the emergency brakes have been applied and wherein the trailer service reservoir has been damaged or ruptured by bleeding incoming supply pressure to the spring brakes until sufficient pressure is developed to release the spring brakes.

DESCRIPTION OF THE PREFERRED EMBODIMENT

Figure 1:
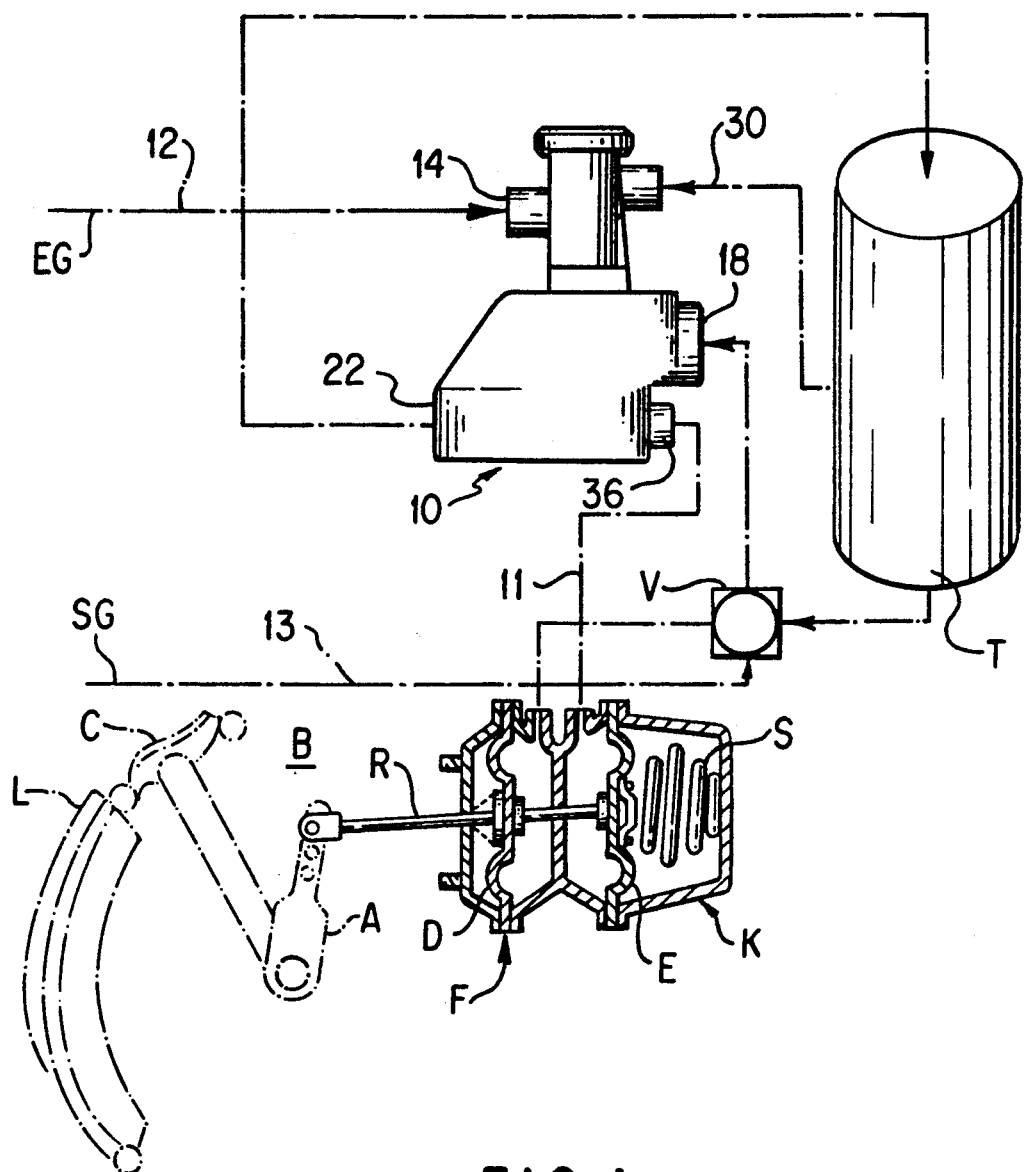
FIG. 1 is schematic illustrational view of the emergency brake control valve assembly of the present invention as shown in line with an emergency supply line, a service supply line, a combination service and emergency spring brake and a service supply reservoir.

With reference to the drawings, FIG. 1 shows a schematic of the brake assembly "B" for a trailer axle. The assembly includes a brake lining "L" which is operated by an S-CAM "C" through a slack adjuster "A". The brake is applied by a push rod "R" driven either by the diaphragm "D" of a service brake "F" or the spring "S" of a spring brake "K". The spring brake is more generally identified as the parking/emergency brake for a trailer. The spring brake is normally held in an "OFF" position by air pressure applied against the diaphragm "E" which pressure is received from the emergency brake control valve assembly 10 through a supply line 11. Pressure to the control valve assembly 10 is provided through an emergency supply line 12 from a gladhand "EG" which is connected to a tractor which carries the compressor for supplying pressure to the brake system. The brake "B" is normally controlled by the service brake "F" by air pressure acting upon the diaphragm "D". The diaphragm is activated by compressed air received through control line 13 extending from a service gladhand IISGI, also connected to the tractor and compressor supply source and which extends through a relay valve "V". Pressure to the service brakes is also supplied through a service reservoir "T" which is pressurized by the compressed air passing through the emergency supply line 12 and the control valve assembly 10.

The emergency brake control valve 10 of the present invention provides several functions. If the service reservoir "T" is empty and the emergency/parking spring brakes "K" applied, the valve will prevent release of the spring brakes by prohibiting sufficient build-up of pressure in the brake chamber against the diaphragm "E" to offset the spring pressure until such time as a minimum operating pressure is established within the service reservoir. Thus, the control valve assembly insures the spring brakes cannot be released until sufficient operating pressure is established within the system to allow braking to be handled independently by the trailer service brakes. The control valve assembly 10 also causes air within the spring brake chamber to be immediately discharged to atmosphere to permit application of the spring brakes in the event of a disruption of supply pressure.

Figure 2:
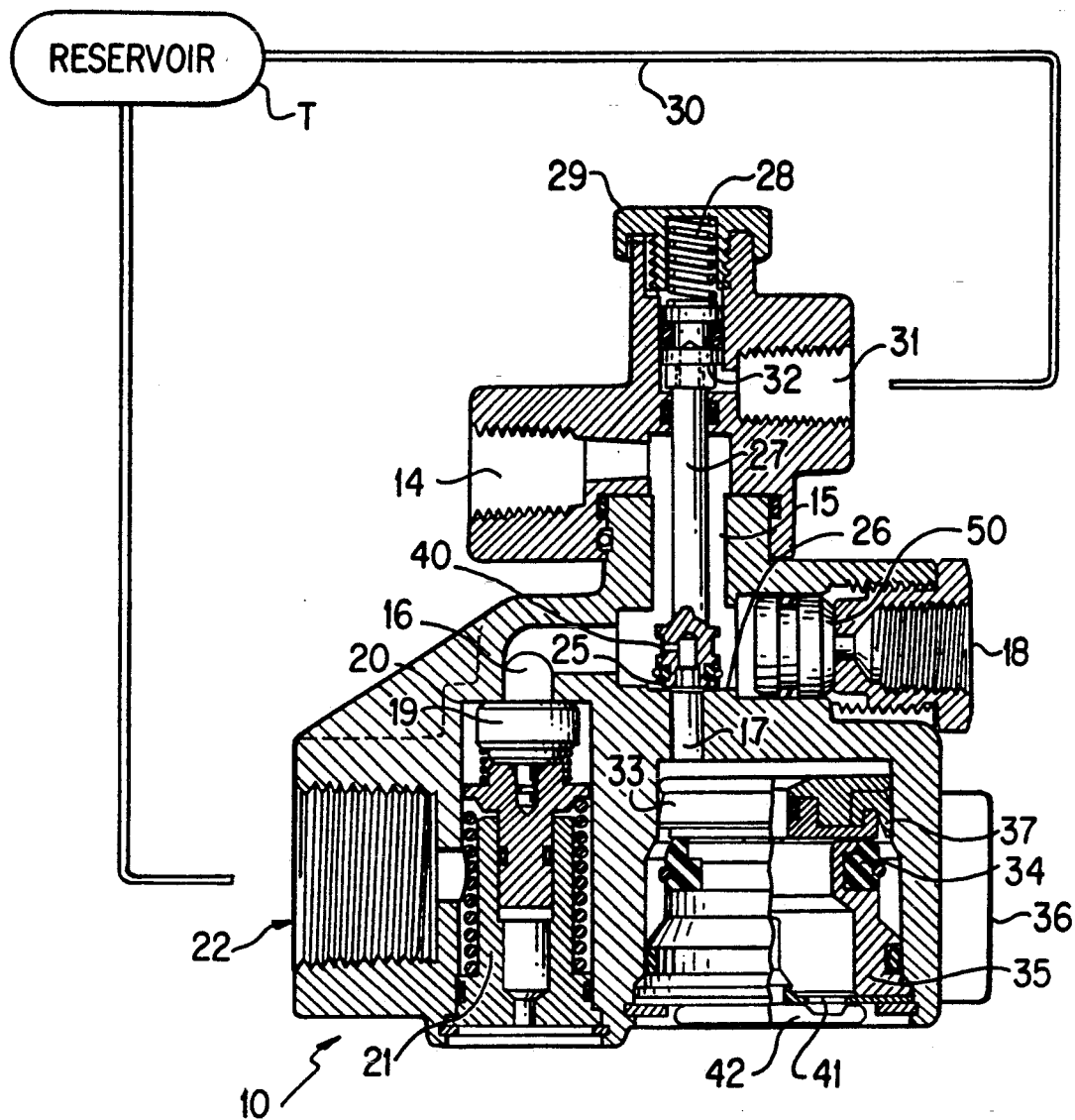
FIG. 2 is an enlarged cross-sectional view taken through the emergency control valve assembly of the present invention showing the connection with the service supply reservoir.

A first embodiment of the emergency brake control valve assembly 10 of the present invention is shown in cross section in FIG. 2 as it is connected with the service reservoir "T". The valve includes a housing having a supply inlet 14 which communicates with a passageway 15 to supply pressure to a service reservoir passageway 16 and spring brake passageway 17. A control or service inlet 18 is also provided for purposes which will be discussed hereinafter. During initial charging of the brake system through the emergency supply line 12, compressed air entering the valve at the inlet supply port 14 is prevented from passing to the service reservoir "T" until pressure within the supply passageway 16 reaches a predetermined minimum, such as 70 psi. The passageway 16 is normally closed by a minimum pressure protection valve 19 which is urged against a valve seat 20 by a plunger and spring assembly 21. Once pressure within the valve housing has reached the required minimum pressure, valve 19 will open allowing gas to be discharged through a discharge port 22 to the service reservoir "T".

To prevent the release of the engaged spring brakes during the initial pressurization of the service reservoir, a spring brake supply valve 24 is provided which normally closes the passageway 15 from the brake supply passageway 17. The spring brake supply valve 24 includes a seal 25 which is urged against valve seat 26 by a plunger 27. The plunger is resiliently urged to close the spring brake supply valve against the valve seat by spring 28. The tension on spring 28 may be adjusted by a control cap 29 threadingly engaged with the valve housing. To permit the spring brake supply valve to open after a predetermined pressure has been established within the service reservoir, a pressure tap 30 is established between the reservoir "T" and inlet 31. The inlet 31 communicates with a piston portion 32 of the plunger 27 which is spaced from the internal passageway 15. Pressure from the service reservoir is applied against the piston 32 and thus against the spring 28, and, when sufficient pressure has been established, the pressure within the service reservoir will cause the spring 28 to be compressed thereby lifting the plunger 27 and opening the spring brake supply valve 24. Air pressure is then supplied through the spring brake inlet passageway 17. The pressure in passageway 17 drives a piston member 33 into engagement with a valve seat 34 of an emergency quick release valve member 35 thereby permitting compressed gas to pass through the spring brake delivery port 36 and supply conduit 11 to the spring brake where pressure is applied against the diaphragm "E" releasing the spring brake "K".

The piston 33 includes an annular check valve 37 which permits a one-way flow of compressed air from the passageway 17 to the delivery port 36. However, as pressure within the passageway 17 begins to drop, the pressure on the lower side of the check valve will cause the valve to close against the adjacent walls of the housing. The greater area at the supply side, or top, of piston 33 will maintain pressure on the spring brake side until the pressure differential rises to a predetermined level, then piston 33 will be lifted from the seat 34, thereby allowing an immediate exhausting of pressure from the spring brakes through the valve 35. The differing active areas exposed to gas pressure on either side of piston 33 created by the valve seat 34 and the annular check valve 37 is such that supply pressure variations will have no effect on spring brake delivery pressure until the pressure differential between the supply side and the delivery side of the piston reaches a predetermined value.

Figure 3:
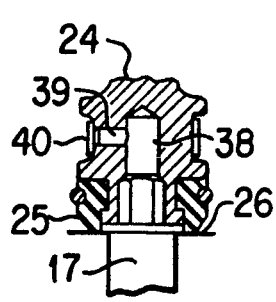
FIG. 3 is an enlarged cross-sectional view of a first embodiment of spring brake supply valve utilized with the valve assembly of the present invention.

The spring brake supply valve 24 shown in FIG. 3 is designed to automatically initiate the exhausting of the spring brakes to atmosphere to allow the application of the brakes in the event there in an interruption in the source of compressed gas supply from the emergency gladhand and from the service reservoir. In order to accomplish this, a passageway 38 within the valve communicates with an outlet port 39 which is normally closed by elastomeric check valve 40. When the pressure within the passageway 15 falls below the pressure within the passageway 17, the elastomeric valve will be forced open discharging passageway 17. This discharge permits the piston 33 to be driven upwardly by the pressure within the spring brake and the spring brake supply line 11 thus opening the supply line to the quick release valve 35. Pressure from the spring brakes is therefore immediately vented to atmosphere by passing through openings 41 and exhaust flap 42. As the air pressure is exhausted from the emergency brakes, the spring brakes are applied automatically. As the plunger 27 forces the spring brake supply valve 24 closed, no further supply of compressed gas is available to the spring or emergency brakes until such time as the service reservoir is brought to an operable level as previously discussed. In the event emergency movement of the trailer is necessary under these situations, mechanical caging of the brakes will be necessary.

In a modification to the present invention, emergency towing or moving of a vehicle once the spring brakes have been applied is achieved by allowing pressure to be supplied to release the emergency brakes. Such emergency towing may be necessary especially in instances where there has been damage to the service reservoir which prohibits the reservoir from maintaining pressure and wherein the trailer may be positioned in an unsafe location.

Figure 4:
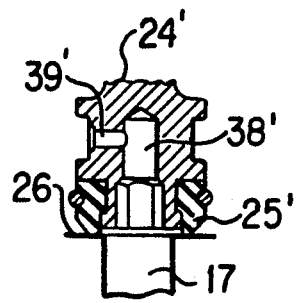
FIG. 4 is an enlarged cross-sectional view of a second embodiment of spring brake supply valve utilized with the valve assembly of the present invention.

With specific reference to FIG. 4, a modified spring brake supply valve 24' is disclosed. As with the previous embodiment, the spring brake supply valve includes an internal passageway 38' which communicates with an outlet port 39' and further includes a valve seal 25' which is urged against the valve seat 26 of the control valve assembly as was previously discussed by action of the plunger 27. In this embodiment however, the elastomeric check valve has been replaced by an outlet port 39' which is a flow restriction orifice of a predetermined size. The flow restriction orifice will always be in open communication with the passageway 15 so that during the initial pressurization of the service reservoir, some compressed gas will be allowed to pass through the supply valve 24' and into the passageway 17 and from there through the spring brake delivery port 36 and supply line 11 to the spring brakes. However, the flow restriction orifice is designed to limit the rate of flow through the supply valve so that the valve 24' is not opened and so that the spring brakes are not released until the service reservoir reaches minimum operating pressure.

In instances where the service reservoir is empty and during its initial charging, as previously discussed, the flow capacity provided a tractor compressor will far exceed the flow permitted through the orifice 39' and pressure will therefore rise within the passageway 16 allowing the opening of the pressure protection valve 19 and permitting pressure to build within the service reservoir. When the reservoir pressure has risen to the desired level, the force generated against the piston 32 will overcome the force of the spring 28 and thus lift the plunger 27 and unseat the valve 24' to provide a full flow of compressed air to the spring brake chambers.

In those instances when a trailer has become disabled and it is no longer possible to pressurize the service reservoir, emergency release of the spring brakes may be accomplished by the supply line pressure being applied through the flow restriction orifice 39'. The pressurization will be slower than with valve 24 opened but will be effective to eventually overcome the force of the springs of the spring brake system thereby allowing emergency towing of the trailer.

In view of the foregoing, both of the embodiments of the present invention provide spring brake controls which prevent the release of the spring brakes after they have been applied until such time as a minimum pressure is established within the service reservoir of the service brake system. In the second embodiment, a measured amount of compressed gas is permitted to flow to the spring brakes, however, the pressure is insufficient to release the spring brakes until such time as the service reservoir has reached its minimum operating level. Further, in both embodiments of the present invention, the spring brakes are automatically applied by exhausting the brakes to atmosphere upon the failure of the service reservoir and supply line pressure.

As previously discussed, the control valve assembly 10 includes a control or service inlet 18 which is used to prevent compounding of braking forces in the event a service brake application is made while the spring brakes are applied. The control inlet 18 communicates with valve 50. When supply pressure is present in passage 15, valve 50 is seated to close inlet 18. When supply pressure is at zero and the spring brakes are therefore applied, any pressure at inlet 18 will unseat valve 50 thereby venting to atmosphere through passage 51 preventing buildup of pressure against service brake diaphragm "D".

We claim:

1. An emergency spring brake control valve assembly for use with air brake systems for controlling supply line pressure to a service reservoir and through an emergency supply line to at least one spring brake comprising, a housing having a supply inlet, a service reservoir outlet and a spring brake delivery port, a first passageway within said housing communicating with said supply inlet, a second passageway within said housing communicating with said spring brake delivery port, a spring brake supply valve means disposed within said housing, means for normally urging said spring brake supply valve means against a first valve seat to close said first passageway from said second passageway until a predetermined pressure is achieved within said service reservoir, a service reservoir supply valve means for controlling supply line pressure from said first passageway into the service reservoir, means for opening said spring brake supply valve means to permit supply line pressure in said first passageway to communicate with said second passageway and therethrough to said spring brake delivery port when a predetermined pressure level is established within the service reservoir, and said spring brake supply valve means including means for venting said second passageway therethrough to said first passageway when the supply line pressure within the said first passageway falls below the pressure in said second passageway.

2. The emergency spring brake control valve assembly of claim 1 in which said means for venting said second passageway includes an opening through said spring brake supply valve means and check valve means normally closing said opening.

3. The emergency spring brake control valve assembly of claim 2 in which said means for normally urging said spring brake supply valve means closed includes a plunger extending through said first passageway and a spring means for urging said plunger towards said second passageway.

4. The emergency spring brake control valve assembly of claim 3 in which said means for opening said spring brake supply valve means includes a service reservoir inlet, said plunger including a piston member spaced from said spring brake supply valve means and communicating with said service reservoir inlet whereby pressure through said service reservoir inlet opposes said spring means to raise said plunger and open said spring brake supply valve means.

5. The emergency spring brake control valve assembly of claim 21 including a quick discharge valve means disposed within said housing and between said spring brake supply valve means and said spring brake delivery port.

6. The emergency spring brake control valve assembly of claim 5 in which said quick discharge valve means includes a piston means disposed intermediate said second passageway and said spring brake delivery port and movable from a first position for permitting supply line pressure to pass from said second passageway to said spring brake delivery port and to a second position for preventing a back-flow of pressure from said spring brake delivery port to said second passageway, said quick discharge valve means including a valve seat against which said piston means is seated when in said first position, and said quick discharge valve means further including a discharge outlet from said housing which is closed when said piston means is in said first position.

7. The emergency spring brake control valve assembly of claim 6 in which said piston means includes an annular outwardly extending check valve for permitting supply line pressure to pass from said second passageway to said spring brake delivery port when said piston means is in said first position and for preventing a back-flow of pressure from said spring brake delivery port to said second passageway when said piston moves from said first position.

8. The emergency spring brake control valve assembly of claim 6 in which said valve assembly includes a service line inlet, check valve means between said service line inlet and said first passageway, said check valve means between said service line inlet and said first passageway being operable to vent a service supply to atmosphere the event of loss of supply line pressure.

9. The emergency spring brake control valve assembly of claim 1 in which said means for venting said second passageway includes an opening through said spring brake supply valve means, said opening communicating said first and second passageways even when the said spring brake supply valve means is closed against said first valve seat, said opening being of a size such that, normally, until such time as said predetermined pressure is achieved within the service reservoir, the pressure within said second passageway is insufficient to release the spring brake.

10. The emergency spring brake control valve assembly of claim 9 in which said means for normally urging said spring brake supply valve means closed includes a plunger extending through said first passageway and a spring means for urging said plunger towards said second passageway.

11. The emergency spring brake control valve assembly of claim 10 in which said means for opening said spring brake supply valve means includes a service reservoir inlet, said plunger including a piston member spaced from said spring brake supply valve means and communicating with said service reservoir inlet whereby pressure through said service reservoir inlet opposes said spring means to raise said plunger and open said spring brake supply valve means.

12. The emergency spring brake control valve assembly of claim 9 including a quick discharge valve means disposed within said housing and between said spring brake supply valve means and said spring brake delivery port.

13. The emergency spring brake control valve assembly of claim 12 in which said quick discharge valve means includes a piston means disposed intermediate said second passageway and said spring brake delivery port and movable from a first position for permitting supply line pressure to pass from said second passageway to said spring brake delivery port and to a second position for preventing a back-flow of pressure from said spring brake delivery port to said second passageway, said quick discharge valve means including a valve seat against which said piston means is seated when in said first position, and said quick discharge valve means further including a discharge outlet from said housing which is closed when said piston means is in said first position.

14. The emergency spring brake control valve assembly of claim 13 in which said piston means includes an annular outwardly extending check valve for permitting supply line pressure to pass from said second passageway to said spring brake delivery port when said piston means is in said first position and for preventing a back-flow of pressure from said spring brake delivery port to said second passageway when said piston moves from said first position.

15. The emergency spring brake control valve assembly of claim 13 in which said valve assembly includes a service line inlet, check valve means between said service line inlet and said first passageway, said check valve means being operable to vent a service pressure to atmosphere in the event of loss of supply line pressure.

16. The emergency spring brake control valve assembly of claim 1 including a quick discharge valve means disposed within said housing and between said spring brake supply valve means and said spring brake delivery port.

17. The emergency spring brake control valve assembly of claim 16 in which said quick discharge valve means includes a piston means disposed intermediate said second passageway and said spring brake delivery port and movable from a first position for permitting supply line pressure to pass from said second passageway to said spring brake delivery port and to a second position for preventing a back-flow of pressure from said spring brake delivery port to said second passageway, said quick discharge valve means including a valve seat against which said piston means is seated when in said first position, and said quick discharge valve means further including a discharge outlet from said housing which is closed when said piston means is in said first position.

18. The emergency spring brake control valve assembly of claim 17 in which said piston means includes an annular outwardly extending check valve for permitting supply line pressure to pass from said second passageway to said spring brake delivery port when said piston means is in said first position and for preventing a back-flow of pressure from said spring brake delivery port to said second passageway when said piston moves from said first position.

19. The emergency spring brake control value assembly of claim 17 in which said valve assembly includes a service line inlet, check valve means between said service line inlet and said first passageway, said check valve means being operable to vent a service supply to atmosphere in the event of loss of supply line pressure.

20. The emergency spring brake control valve assembly of claim 18 wherein said piston means includes an upper surface area which is exposed to supply line pressure and a lower outer surface area surrounding said valve seat of said quick discharge valve means which is exposed to the pressure of the spring brake delivery port when said piston means is in said first position, the upper surface area which is exposed to supply line pressure being sufficiently greater than a combination of the areas of the lower outer surface area and an area defined by said annular check valve which are exposed to the pressure at the spring brake delivery port so that variations in supply pressure will not allow said piston means to move from said first position until a predetermined minimum supply line pressure is achieved.

21. The emergency spring brake control valve assembly of claim 1 in which said valve assembly includes a service line inlet, check valve means between said service line inlet and said first passageway, said check valve means being operable to vent a service supply to atmosphere in the event of loss of supply line pressure.

22. An emergency spring brake control valve assembly for use with air brake systems for controlling supply line pressure to a service reservoir and through an emergency supply line to at least one spring brake comprising, a housing having a supply inlet, a service reservoir outlet and a spring brake delivery port, a first passageway within said housing communicating with said supply inlet, a second passageway within said housing communicating with said spring brake delivery port, a spring brake supply valve means disposed within said housing, means for closing said spring brake supply valve means against a first valve seat to close said first passageway from said second passageway until a predetermined pressure is achieved within the service reservoir, means for opening said spring brake supply valve means to permit supply line pressure in said first passageway to communicate with said second passageway and therethrough to said spring brake delivery port when a predetermined pressure level is established within the service reservoir, and said spring brake supply valve means including means for venting said second passageway to said first passageway when the supply line pressure within the said first passageway falls below the pressure in said second passageway.

23. The emergency spring brake control valve assembly of claim 22 in which said means for venting said second passageway includes an opening through said spring brake supply valve means and check valve means normally closing said opening.

24. The emergency spring brake control valve assembly of claim 22 in which said means for venting said second passageway includes an opening through said spring brake supply valve means, said opening communicating said first and second passageways even when the said spring brake supply valve means is closed against said first valve seat, said opening being of a size such that, normally, until such time as said predetermined pressure is achieved within the service reservoir, the pressure within said second passageway is insufficient to release the spring brake.

* * * * *